United States Patent
Oveyssi et al.

(10) Patent No.: US 7,006,324 B1
(45) Date of Patent: Feb. 28, 2006

(54) DISK DRIVE INCLUDING AN AIRFLOW BLOCKER WITH A PLANAR PORTION EXTENDING FROM A BLOCKER ARM PORTION

(75) Inventors: Kamran Oveyssi, San Jose, CA (US); Chen-Chi Lin, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 247 days.

(21) Appl. No.: 10/328,609

(22) Filed: Dec. 23, 2002

(51) Int. Cl.
  *G11B 33/14* (2006.01)

(52) U.S. Cl. .................................................. 360/97.02

(58) Field of Classification Search ............. 360/97.02, 360/97.03, 97.01
See application file for complete search history.

(56) References Cited

U.S. PATENT DOCUMENTS

| | | | | |
|---|---|---|---|---|
| 4,703,379 A | * | 10/1987 | Bogdanski | 360/118 |
| 4,821,130 A | * | 4/1989 | Bernett et al. | 360/78.04 |
| 4,879,618 A | * | 11/1989 | Iida et al. | 360/264.1 |
| 5,134,530 A | * | 7/1992 | Hall | 360/97.03 |
| 5,452,161 A | * | 9/1995 | Williams | 360/256.1 |
| 5,541,791 A | | 7/1996 | Yamasaki et al. | |
| 5,602,700 A | * | 2/1997 | Viskochil et al. | 360/256.1 |
| 5,715,118 A | * | 2/1998 | Tacklind | 360/256.1 |
| 5,854,725 A | * | 12/1998 | Lee | 360/266 |
| 6,271,987 B1 | | 8/2001 | Allsup et al. | |
| 6,424,487 B1 | | 7/2002 | Nagl et al. | |
| 6,545,842 B1 | * | 4/2003 | Rao et al. | 360/244.2 |
| 6,549,365 B1 | * | 4/2003 | Severson | 360/97.02 |
| 6,560,065 B1 | * | 5/2003 | Yang et al. | 360/97.02 |
| 6,570,742 B1 | * | 5/2003 | Korkowski et al. | 360/266 |
| 6,600,625 B1 | * | 7/2003 | Munninghoff et al. | 360/97.02 |
| 6,624,966 B1 | * | 9/2003 | Gustafson et al. | 360/97.02 |
| 2002/0149876 A1 | * | 10/2002 | Sakata et al. | 360/97.02 |

* cited by examiner

*Primary Examiner*—Brian E. Miller
(74) *Attorney, Agent, or Firm*—Stetina, Brunda, Garred & Brucker

(57) ABSTRACT

A disk drive includes a disk drive base and at least one rotatable disk including a disk surface extending to an outer disk edge. The disk drive further includes a head stack assembly rotatably attached to the disk drive base in operable communication with the disk, the head stack assembly including an actuator arm disposed adjacent the disk surface. The disk drive further includes an airflow blocker coupled to the disk drive base for mitigation of disk rotation induced airflow upon the head stack assembly. The airflow blocker includes a blocker body disposed adjacent the outer disk edge attached to the disk drive base. The airflow blocker further includes a blocker arm portion extending from the blocker body along the disk surface. The airflow blocker further includes a planar portion extending from the blocker arm portion disposed along the actuator arm when the actuator arm is rotated over the disk surface.

7 Claims, 4 Drawing Sheets

DISK DRIVE INCLUDING AN AIRFLOW BLOCKER WITH A PLANAR PORTION EXTENDING FROM A BLOCKER ARM PORTION

CROSS-REFERENCE TO RELATED APPLICATIONS

This application is related to U.S. Pat. No. 6,624,966, entitled DISK DRIVE HAVING AIRFLOW SUPPRESSOR COMB FOR REDUCED DISK ROTATION INDUCED AIRFLOW, filed on May 31, 2001, incorporated herein by reference d this application is further related to U.S. Pat. No. 6,560,065, entitled DISK DRIVE HAVING AIRFLOW SUPPRESSOR COMB WITH CURVED EXTENSION FOR REDUCED DISK ROTATION INDUCED AIRFLOW, filed on May 31, 2001, incorporated herein by reference.

BACKGROUND OF THE INVENTION

1. Field of the Invention

The present invention relates generally to disk drives, and more particularly to a disk drive including an airflow blocker with a planar portion extending from a blocker arm portion.

2. Description of the Prior Art

The typical hard disk drive includes a disk drive base, a head disk assembly (HDA), and a printed circuit board assembly (PCBA) attached to the disk drive base. The head disk assembly includes at least one magnetic disk, a spindle motor for rotating the disk, and a head stack assembly (HSA) having an actuator assembly having at least one transducer head, typically several, for reading and writing data from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

A topic of concern is the desire to reduce the effects of airflow generated within the disk drive due to rotation of the disks. Of particular concern is the occurrence of turbulent airflow which may tend to excite a resonance response of the actuator assembly. This results in an increase in the percent off-track values of the associated head. Further, such disk rotation induced airflow may result in a force applied to the actuator assembly, i.e., windage. Further, such disk rotation induced airflow may result in vibration of the disk or disk flutter. In addition, it is contemplated that the disk rotation induced airflow tends to become turbulent radially beyond the outer disk edges due to boundary layer separation occurring within various cavities within the disk drive. Such turbulent airflow further tends to impact the resonance response of the actuator assembly and disk flutter. Accordingly, there is a need in the art for an improved disk drive for mitigation of such disk rotation induced airflow in comparison to the prior art.

SUMMARY OF THE INVENTION

An aspect of the invention can be regarded as a disk drive including a disk drive base and at least one rotatable disk including a disk surface extending to an outer disk edge. The disk drive further includes a head stack assembly rotatably attached to the disk drive base in operable communication with the disk, the head stack assembly including an actuator arm disposed adjacent the disk surface. The disk drive further includes an airflow blocker coupled to the disk drive base for mitigation of disk rotation induced airflow upon the head stack assembly. The airflow blocker includes a blocker body disposed adjacent the outer disk edge attached to the disk drive base. The airflow blocker further includes a blocker arm portion extending from the blocker body along the disk surface. The airflow blocker further includes a planar portion extending from the blocker arm portion disposed along the actuator arm when the actuator arm is rotated over the disk surface.

According to various embodiments, the blocker arm portion may be disposed upstream of the head stack assembly. The disk surface may be a first disk surface and the disk includes a second disk surface disposed opposite the first disk surface. The actuator arm may be a first actuator arm and the head stack assembly includes a second actuator arm disposed adjacent the second disk surface. The blocker arm portion may be a first blocker arm portion and the airflow blocker includes a second blocker arm portion extending from the blocker body along the second disk surface. The planar portion may be a first planar portion and the airflow blocker includes a second planar portion extending from the second blocker arm portion along the second actuator arm when the second actuator arm is rotated over the second disk surface. The first planar portion may be attached to the second planar portion adjacent the outer disk edge. The planar portion may be disposed between the actuator arm and the disk surface when the actuator arm is rotated over the disk surface. The actuator arm may be disposed between the planar portion and the disk surface when the actuator arm is rotated over the disk surface. The planar portion may be an inner planar portion, and the airflow blocker further includes an outer planar portion extending from the blocker arm portion with the actuator arm being disposed between the outer planar portion and the inner planar portion when the actuator is rotated over the disk surface.

DESCRIPTION OF THE PREFERRED EMBODIMENTS

Figure 1:
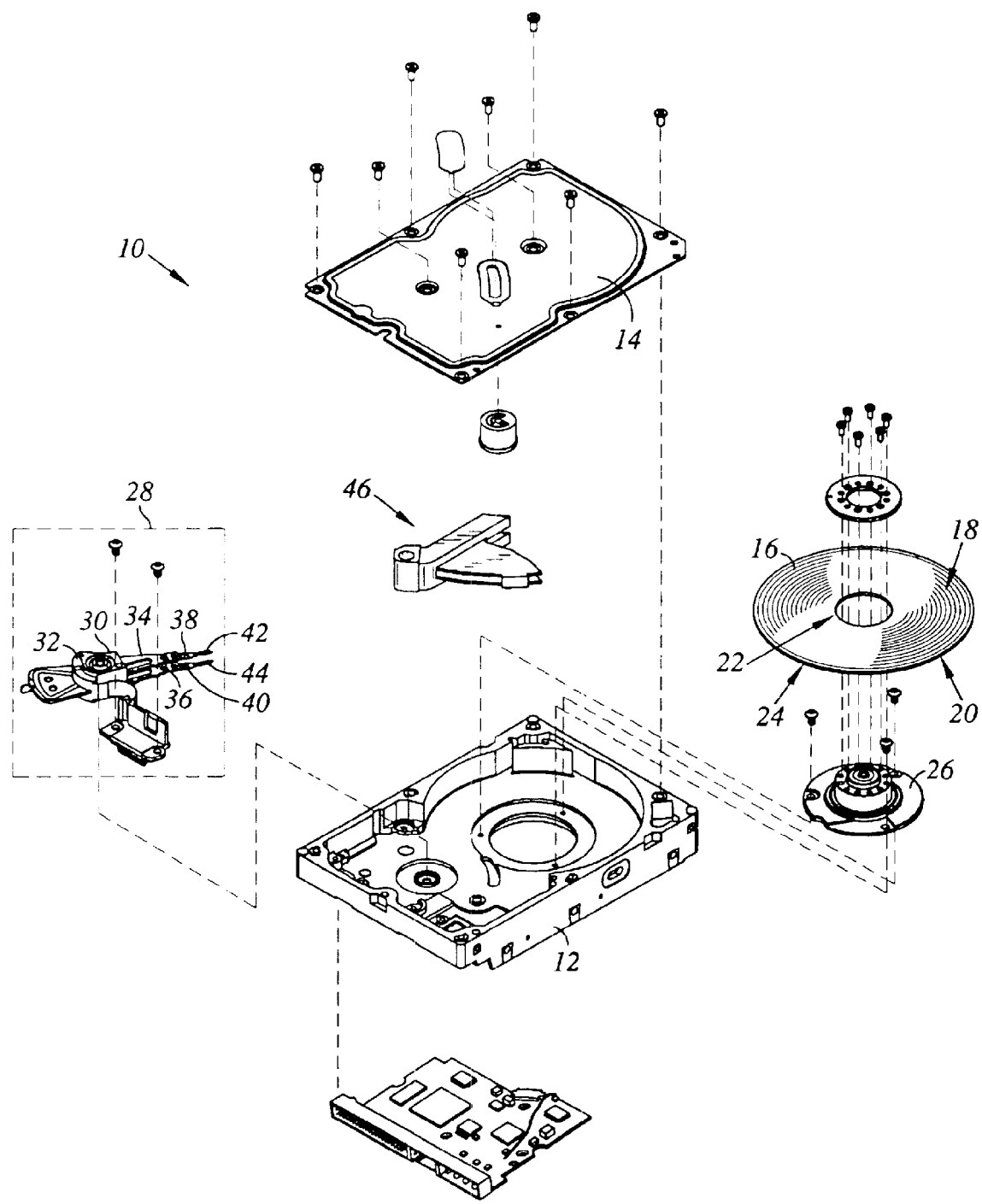
FIG. 1 is a perspective view of a disk drive including an airflow blocker as constructed in accordance with an aspect of the present invention.

Referring now to the drawings wherein the showings are for purposes of illustrating preferred embodiments of the present invention only, and not for purposes of limiting the same, FIGS. 1–7 illustrate a disk drive and an airflow blocker in accordance with aspects of the present invention.

Referring now to FIG. 1, there is depicted an exploded perspective view of a disk drive 10 constructed in accordance with an aspect of the present invention. The disk drive 10 includes a head disk assembly (HDA) and a printed circuit board assembly (PCBA). The head disk assembly includes a disk drive base 12 and a cover 14 that collectively house at least one magnetic disk 16. The disk 16 contains a plurality of tracks for storing data The tracks are disposed upon opposing first and second disk surfaces 18, 20 of the disk 16 that extend between an inner disk edge 22 and an outer disk edge 24 of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator assembly 30. In the embodiment shown, the actuator assembly 30 includes an actuator body 32 and first and second actuator arms 34, 36 that extend from the actuator body 32. Distally attached to the first and second actuator arms 34, 36 are first and second suspensions 38, 40. The first and second suspensions 38, 40 respectively support transducers 42, 44. It is contemplated that the number of actuator arm may vary depending upon the number of disks and disk surfaces utilized.

An aspect of the invention can be regarded as the disk drive 10 including the disk drive base 12 and at least one rotatable disk, such as disk 16, including a disk surface, such as the first disk surface 18, extending to the outer disk edge 24. The disk drive 10 further includes the head stack assembly 28 rotatably attached to the disk drive base 12 in operable communication with the disk 16. The head stack assembly 28 includes an actuator arm disposed adjacent a disk surface, such as the first actuator arm 34 disposed adjacent the first disk surface 18.

Figure 2:
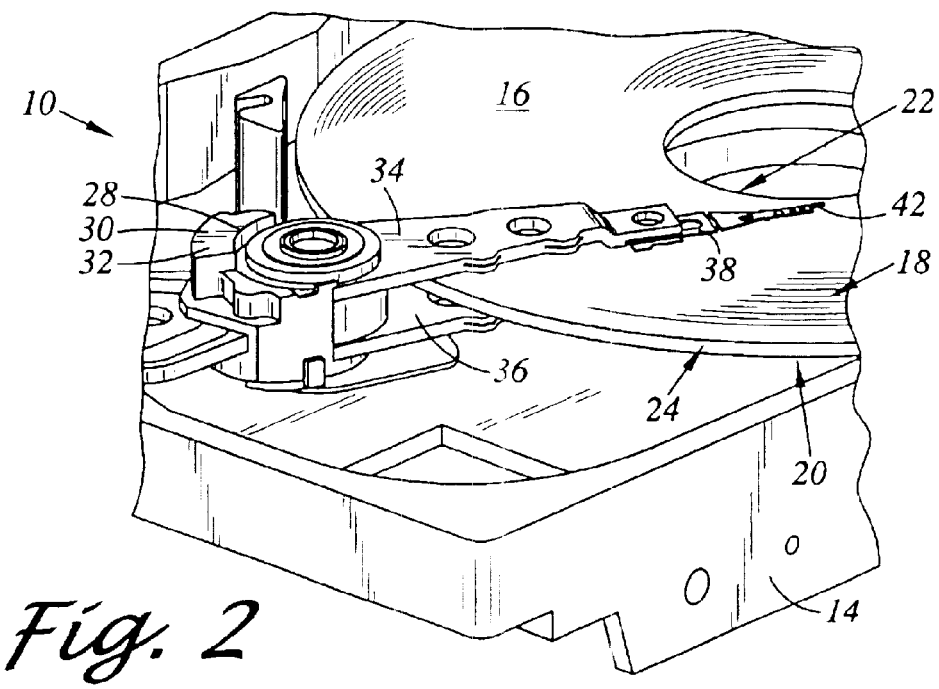
FIG. 2 is a perspective view of a portion of the disk drive of FIG. 1 as shown with the head stack assembly assembled with the disk and disk drive base without the airflow blocker.
Figure 3:
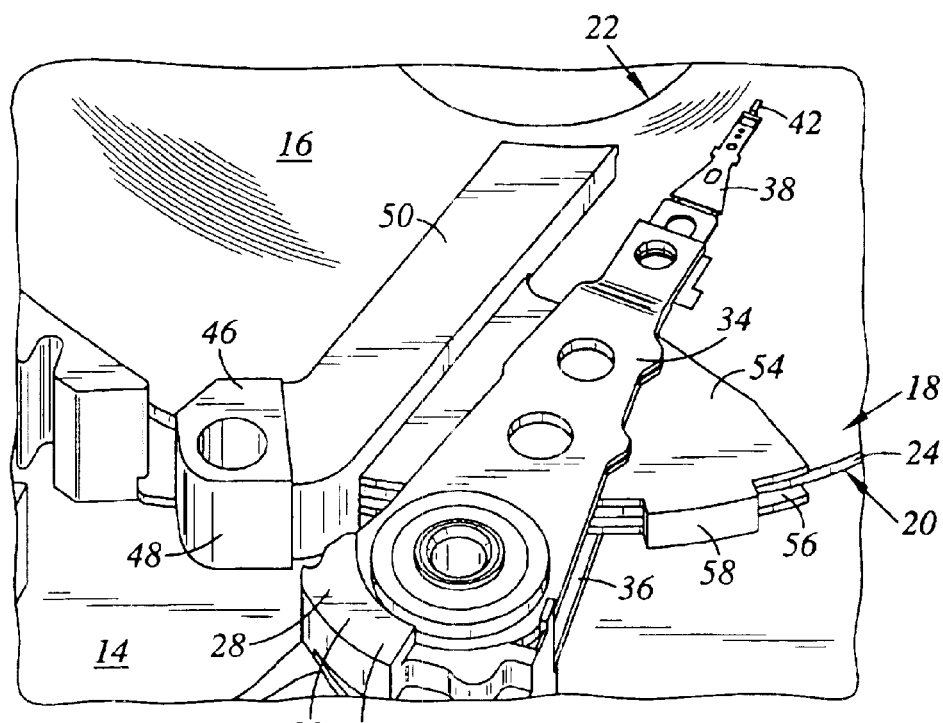
FIG. 3 is another perspective view of a portion of the disk drive of FIG. 1 as shown with the head stack assembly assembled with the disk and disk drive base along with the airflow blocker.
Figure 4:
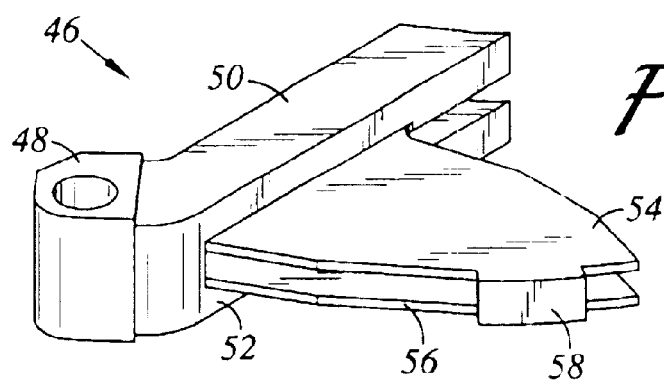
FIG. 4 is a perspective view of the airflow blocker of FIGS. 1 and 3.

Referring additionally to FIGS. 2–4, the disk drive 10 further includes an airflow blocker 46 coupled to the disk drive base 12 for mitigation of disk rotation induced airflow upon the head stack assembly 28. The airflow blocker 46 includes a blocker body 48 disposed adjacent the disk outer disk edge 24 attached to the disk drive base 12. The airflow blocker 46 further includes a blocker arm portion, such as the first blocker arm portion 50 of the first and second blocker arm portions 50, 52 of the embodiment shown, extending from the blocker body 48 along the disk surface, such as the first disk surface 18. The airflow blocker 48 further includes a planar portion, such as the first planar portion 54 of the first and second planar portion 54, 56, extending from the first blocker arm portion 50 disposed along the first actuator arm 34 when the first actuator arm 34 is rotated over the first disk surface 18.

In the embodiment shown, the second blocker arm portion 52 extends from the blocker body 48 along the second disk surface 20. The second planar portion 56 extends from the second blocker arm portion 52 disposed along the second actuator arm 36 when the second actuator arm 36 is rotated over the disk surface 16. It is contemplated that additional blocker arm portions with planar portions may be utilized in association with additional disks that may be provided.

It is contemplated that the airflow blocker 46 and in particular the first and second blocker arm portions 50, 52 and the first and second planar portions 54, 56 mitigate disk rotation induced airflow in comparison to a disk drive configuration which does not include the airflow blocker 46. It is contemplated that the first and second planar portions 54, 56 tend to reduce the relative amount of turbulent airflow resulting in a relatively laminar airflow pattern due to the relative proximity of the first and second planar portions 54, 56 to the first and second disk surfaces 18, 20. This tends to mitigate airflow associated with excitation of the head stack assembly rigid body motion (i.e., arm turbulence), resonance response windage experienced by the head stack assembly 28, and vibration of the disk 16 (i.e., disk flutter) in comparison to a disk drive configuration without the airflow blocker 46.

In the embodiment shown, the first and second planar portions 54, 56 are respectively disposed between the first and second actuator arms 34, 36 and the first and second disk surfaces 18, 20. In this regard, the first and second actuator arms 34, 36 may be bent to accommodate the first and second planar portions 54, 56. In this regard, the first and second actuator arms 34, 36 may be formed to have a greater gap with the first and second disk surfaces 18, 20 adjacent the outer disk edge 24 in comparison to the distal portions thereof supporting the first and second suspensions 38, 40. For example, the gap between the first and second actuator arms 34, 36 and the first and second disk surfaces 18, 20 adjacent the outer disk edge 24 may be 1.5 mm so as to accommodate first and second planar portions 54, 56 having a thickness of approximately 1 mm.

It is contemplated that the relative surface area of the first and second planar portions 54, 56 and the amount of extension of the first and second planar portions 54, 56 between the inner and outer disk edges 22, 24 may be more or less than that shown. The first and second planar portions 54, 56 may be formed of a variety of materials such a plastic for example. In this regard, the airflow blocker 46 may be formed of plastic and readily formed of a single integral piece. However, it is contemplated that portions thereof may be separately formed and then assembled. So as to enhance the structural integrity of the first and second planar portions 54,56, the first and second planar portions 54, 56 may be attached to each other adjacent the outer disk edge 24. In this regard, a tab 58 may be provided that connects the first and second planar portions 54, 56.

As shown, the disk drive 10 is configured to rotate the disk 16 in a counter-clockwise direction. In this regard, the airflow blocker 46 is disposed up-stream of the head stack assembly 28. It is contemplated that the airflow blocker 46 may be angularly disposed about the disk 16 at other locations relative to the head stack assembly 28. It is contemplated that while the first and second blocker arm portions 50, 52 are disposed radially with respect to the center of the disk 16, other radial orientations are contemplated. For example, an orientation which is more tangential with inner disk edge 22 may be utilized. In the embodiment shown, the first and second blocker arm portions 50, 52 extend substantially between the distance between the inner and outer disk edges 22, 24. In this regard, the first and second blocker arm portions 50, 52 substantially extend along the first and second suspensions 38,40 with the actuator assembly 30 rotated towards the inner disk edge 22 for mitigation of disk rotation induced airflow upon the first and second suspensions 38, 40. It is contemplated, however, that the first and second blocker arm portions 50, 52 need not extend as far as shown between the inner and outer disk edges 22, 24.

Figure 5:
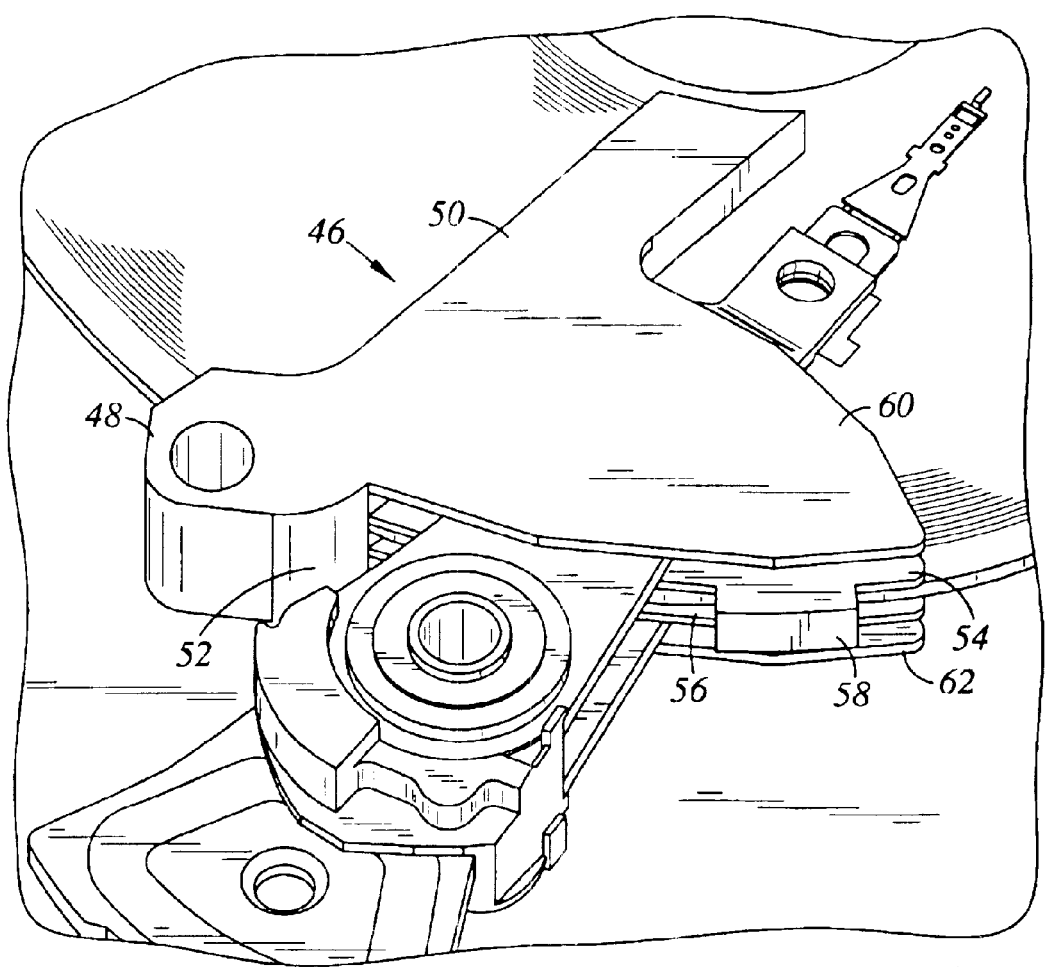
FIG. 5 is a perspective view of a portion of a disk drive similar to that of FIG. 3, however, with an airflow blocker according to another aspect of the present invention.
Figure 6:
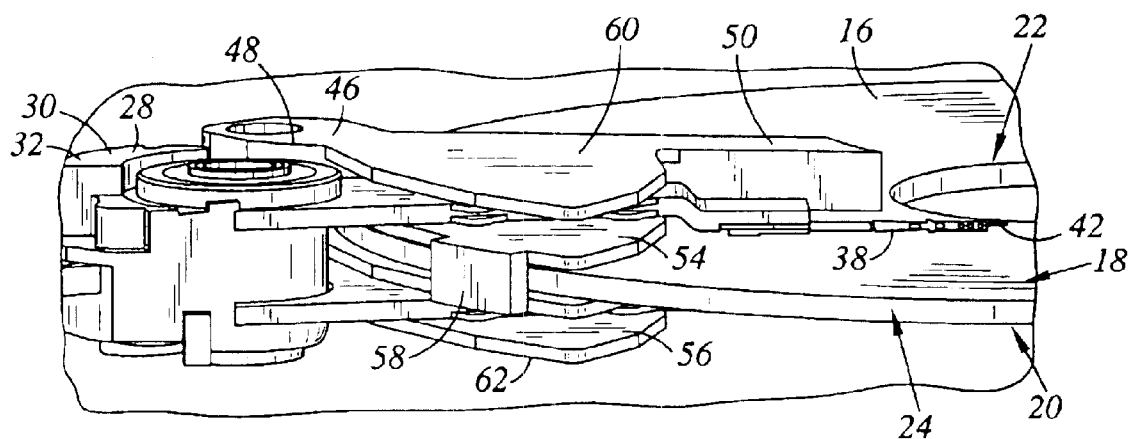
FIG. 6 is a side perspective view of the portion of the disk drive shown in FIG. 5.

Referring now to FIG. 5, there is depicted a perspective view of a portion of the disk drive 10 similar to that of FIG. 3, however, with the airflow blocker 46 according to another aspect of the present invention. In this regard, the disk drive 10 is similar in construction to that shown in the embodiment shown in FIGS. 1–4, however, with the differences noted with respect to the airflow blocker 46. FIG. 6 is a side perspective view of the portion of the disk drive shown in FIG. 5. In the embodiment shown in FIG. 5, the airflow blocker 46 further includes first and second outer planar portions 60, 62 that extend from the first and second actuator arms 34, 36. The first and second outer planar portions 60, 62 are disposed along the first and second actuator arms 34, 36 when the first and second actuator arms 34, 36 are rotated over the first and second disk surfaces 18, 20. Moreover, the first and second outer planner portions 60, 62 are relatively positioned with the first and second actuator arms 34, 36 disposed between the first and second outer planner portions 60, 62 and the first and second disk surfaces 18, 20 for further mitigating disk rotation induced airflow upon the head stack assembly 28.

Figure 7:
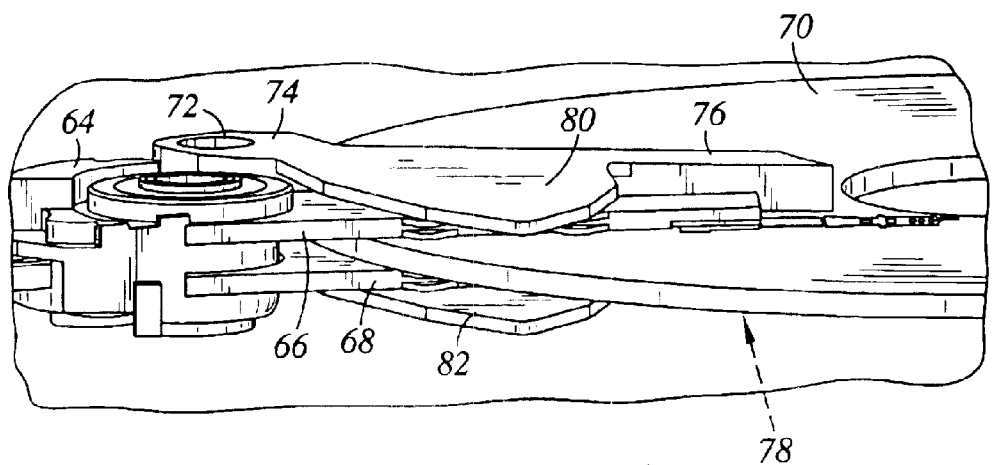
FIG. 7 is a perspective view of a portion of a disk drive similar to that of FIG. 6, however, with an airflow blocker according to another aspect of the present invention.

Referring now to FIG. 7, there is depicted a perspective view of a portion of the disk drive similar 10 to that of FIG. 3, however, with an airflow blocker 46 according to another aspect of the present invention. In this regard, the disk drive 10 is similar in construction to that shown in the embodiment shown in FIGS. 1–4, however, with the differences noted. The disk drive 10 includes a head stack assembly 64 includes first and second actuator arms 66, 68 disposed adjacent a disk 70. The airflow blocker 72 includes a blocker body 74 with first and second blocker arm portions 76, 78 (shown in phantom lead line; it is understood that the second blocker arm portion 78 is disposed beneath the disk 70 and extends from the blocker body 74) extending from the blocker body 74. In this embodiment, the airflow blocker 72 further includes first and second outer planar portions 80, 82 respectively extending from the first and second blocker arm portions 76, 78. The first and second blocker arm portions 76, 78 are respectively positioned with the first and second actuator arms 66, 68 disposed between the first and second blocker arm portions 76, 78 and the disk 70. In this regard, the airflow blocker 72 is similar in construction as the airflow blocker 46, however, no portion of the airflow blocker 72 is disposed between the first and second actuator arms 66, 68 and the disk 70. As such, in this embodiment, the first and second actuator arms 66, 68 may be formed to be relatively flat and do not require to be formed to accommodate any structures between the first and second actuator arms 66, 68 and the disk 70.

We claim:

1. A disk drive comprising:
a disk drive base;
at least one rotatable disk including a disk planar surface extending to an outer disk edge;
a head stack assembly rotatably attached to the disk drive base in operable communication with the disk, the head stack assembly including an actuator arm disposed adjacent the disk surface; and
an airflow blocker coupled to the disk drive base for mitigation of disk rotation induced airflow upon the head stack assembly, the airflow blocker comprising;
a blocker body disposed adjacent the outer disk edge attached to the disk drive base;
a blocker arm portion extending from the blocker body over the disk surface; and
a planar portion extending from the blocker arm portion disposed across the actuator arm and over the disk surface when the actuator arm is rotated over the disk surface.

2. The disk drive of claim 1 wherein the blocker arm portion is disposed upstream of the head stack assembly.

3. The disk drive of claim 1 wherein the disk surface is a first disk surface and the disk includes a second disk surface disposed opposite the first disk surface, the actuator arm is a first actuator arm and the head stack assembly includes a second actuator arm disposed adjacent the second disk surface, the blocker arm portion is a first blocker arm portion and the airflow blocker includes a second blocker arm portion extending from the blocker body over the second disk surface, the planar portion is a first planar portion and the airflow blocker includes a second planar portion extending from the second blocker arm portion across the second actuator arm and over the disk surface when the second actuator arm is rotated over the second disk surface.

4. The disk drive of claim 3 wherein the first planar portion is attached to the second planar portion adjacent the outer disk edge.

5. The disk drive of claim 1 wherein the planar portion is disposed between the actuator arm and the disk surface when the actuator arm is rotated over the disk surface.

6. The disk drive of claim 1 wherein the actuator arm is disposed between the planar portion and the disk surface when the actuator arm is rotated over the disk surface.

7. The disk drive claim 1 wherein the planar portion is an inner planar portion, the airflow blocker further includes an outer planar portion extending from the blocker arm portion with the actuator arm being disposed between the outer planar portion and the inner planar portion when the actuator is rotated over the disk surface.

* * * * *